(12) United States Patent
Lei et al.

(10) Patent No.: US 11,815,593 B2
(45) Date of Patent: Nov. 14, 2023

(54) METHOD AND SYSTEM FOR PRECISE LOCATION OF HIGH SLOPE COLLAPSE AREA

(71) Applicant: Tianjie Lei, Beijing (CN)

(72) Inventors: Tianjie Lei, Beijing (CN); Yazhen Zhang, Beijing (CN); Xiaoxuan Xu, Beijing (CN); Chao Li, Beijing (CN); Qiang Li, Beijing (CN); Li Zhang, Beijing (CN); Adu Gong, Beijing (CN); Kaiyang Ding, Beijing (CN); Weiwei Wang, Beijing (CN); Jinhong Wan, Beijing (CN); Huaidong Zhao, Beijing (CN); Haoyu Yang, Beijing (CN)

(73) Assignee: Tianjie Lei, Beijing (CN)

( * ) Notice: Subject to any disclaimer, the term of this patent is extended or adjusted under 35 U.S.C. 154(b) by 534 days.

(21) Appl. No.: 16/993,530

(22) Filed: Aug. 14, 2020

(65) Prior Publication Data

US 2021/0048523 A1 Feb. 18, 2021

(30) Foreign Application Priority Data

Aug. 15, 2019 (CN) .......................... 201910752411.9

(51) Int. Cl.
*G01S 13/90* (2006.01)
*G06T 7/60* (2017.01)

(52) U.S. Cl.
CPC ............ *G01S 13/9023* (2013.01); *G06T 7/60* (2013.01); *G06T 2207/10028* (2013.01); *G06T 2207/30181* (2013.01)

(58) Field of Classification Search
CPC ..... G01S 13/9023; G01S 13/867; G06T 7/60; G06T 2207/10028; G06T 2207/30181; G06T 2207/10044
See application file for complete search history.

(56) References Cited

U.S. PATENT DOCUMENTS

| 6,850,183 B2 * | 2/2005 | Reeves | G01S 13/867 342/28 |
| 2010/0045513 A1 * | 2/2010 | Pett | G01S 13/867 342/25 C |

\* cited by examiner

*Primary Examiner* — Peter M Bythrow
*Assistant Examiner* — Nazra Nur Waheed
(74) *Attorney, Agent, or Firm* — Panitch Schwarze Belisario & Nadel LLP

(57) ABSTRACT

The present disclosure provides a method and a system for precise location of a high slope collapse area. Firstly, the slope images in a long time series are obtained, the slope images in the long time series are composed into a two-dimensional slope deformation graph, and an area with the maximum deformation in the two-dimensional slope deformation graph is selected as a deformation area. Then, the deformation area is segmented by straight line, and the deformation region obtained by straight line segmentation is displayed in overlapping way in the slope images of long time series, and the region corresponding to the connecting line with the largest change range is selected as the monitoring line area from the overlapping image. Finally, the monitoring points are selected from the monitoring line area to determine the location of the high slope collapse area.

4 Claims, 4 Drawing Sheets

METHOD AND SYSTEM FOR PRECISE LOCATION OF HIGH SLOPE COLLAPSE AREA

CROSS-REFERENCE TO RELATED APPLICATION

This application claims priority under 35 U.S.C. § 119(b) to Chinese Patent Application No. 201910752411.9, filed Aug. 15, 2019, the disclosure of which is incorporated herein by reference.

TECHNICAL FIELD

The present invention relates to the slope monitoring field, and in particular, to a method and a system for precise location of a high slope collapse area.

BACKGROUND

A high slope deformation monitoring project is a quite difficult project in the world. Slope deformation is a type of geological disaster that happens frequently. It has the characteristics of suddenness, strong destructiveness, and high harmfulness. It is widely distributed all over the world and the harm is extremely serious. It not only threatens people's lives and property safety, but also restricts the construction and operation of large-scale projects. Therefore, strengthening slope monitoring is an important work content of disaster reduction and prevention projects, and accurately determining the location of the high slope collapse area is the primary task of slope deformation monitoring.

A traditional method to determine the location of the high slope collapse area only relies on the manual determining of the specific location of the collapse area in the slope deformation area. A two-dimensional displacement graph of deformation of the slope is obtained by using ground-based interferometric synthetic aperture radar. Through manual interpretation conducted according to the two-dimensional displacement graph, only an approximate location of the collapsed area can be marked according to the slope deformation, but coordinates of a specific location of the collapsed area cannot accurately be indicated. As a result, the specific location of the slope collapse area cannot be monitored in real time.

SUMMARY

The purpose of the present invention is to provide a method and system for precise location of a high slope collapse area, to accurately determine a specific location of a collapsed area, so as to realize the real-time monitoring of a specific location of the slope collapsed area.

To achieve the above purpose, the present invention provides the following schemes:

A method for precise location of a high slope collapse area includes the following steps:

Long time series of slope images are obtained by ground-based synthetic aperture radar;

The slope images in long time series are synthesized into a two-dimensional slope deformation graph by using a false color composition.

Selecting an area with the maximum deformation in the two-dimensional slope deformation graph as a deformed area;

conducting line partitioning on a deformed area in a slope image at the first time point in the slope images in the long time series, and setting multiple reference points on each straight line;

conducting line partitioning on deformed areas in slope images in a long time series, including slope images in all time points after the first time point, of the slope images in the long time series through line connection based on the multiple reference points of each straight line, to obtain a corresponding connecting line of each straight line in a slope image in each time series that is after a first time series;

displaying deformed areas, obtained after line connection, in the slope images in the long time series in an overlapping manner, to obtain an overlapped image of the deformed areas;

selecting an area that is in the overlapped image and that is corresponding to a connecting line with the largest variation range as a monitoring line area;

dividing a monitoring line area in the slope image at the first time point in the slope images in the long time series at an equal spacing to obtain multiple monitoring points; and determining a location of a collapsed area of a high slope according to a coordinate change of each monitoring point in the slope images in the long time series.

Optionally, after the selecting an area with the maximum deformation in the two-dimensional slope deformation graph as a deformed area, the method further includes:

conducting grid division on the deformed area in the slope image at the first time point in the slope images in the long time series, and determining a reference object at each grid intersection;

conducting grid division on the deformed areas in the slope images in the long time series after the first time point through intersection-based line connection by using the reference object as an intersection, to obtain a corresponding grid of each grid in a deformed area in a slope image at each time point after the first time point; and selecting an area with the maximum deformation in the deformed areas according to shape changes of each grid and the corresponding grid of the grid as an updated deformed area.

Optionally, after the selecting an area that is in the overlapped image and that is corresponding to a connecting line with the largest variation range as a monitoring line area, the method further includes:

conducting cross-section analysis on the monitoring line area to obtain a ground surface trend and a corresponding underground stratum attribute of the monitoring line area.

Optionally, the determining a location of a collapsed area of a high slope according to a coordinate change of each monitoring point in the slope images in the long time series specifically includes:

establishing a deformation broken-line graph of each monitoring point according to coordinates of the monitoring point in a slope image in each time series; and determining a location of a monitoring point with the largest variation range in the deformation broken-line graph as the location of the collapsed area of the high slope.

A system for precise location of a high slope collapse area includes:
- a slope image obtaining module, configured to obtain slope images in a long time series by using a ground-based synthetic aperture radar;
- a slope image composition module, configured to compose the slope images in the long time series into a two-dimensional slope deformation graph by using a false color composition;
- a deformed area selection module, configured to select an area with the maximum deformation in the two-dimensional slope deformation graph as a deformed area;
- a first line partitioning module, configured to conduct line partitioning on a deformed area in a slope image at the first time point in the slope images in the long time series, and set multiple reference points on each straight line;
- a second line partitioning module, configured to conduct line partitioning on deformed areas in slope images in a long time series, including slope images in all time points after the first time point, of the slope images in the long time series through line connection based on the multiple reference points of each straight line, to obtain a corresponding connecting line of each straight line in a slope image in each time series that is after a first time series;
- a deformed area overlapping module, configured to display deformed areas, obtained after line connection, in the slope images in the long time series in an overlapping manner, to obtain an overlapped image of the deformed areas;
- a monitoring line area selection module, configured to select an area that is in the overlapped image and that is corresponding to a connecting line with the largest variation range as a monitoring line area;
- a monitoring point division module, configured to divide a monitoring line area in the slope image at the first time point in the slope images in the long time series at an equal spacing to obtain multiple monitoring points; and
- a high-slope collapsed area location determining module, configured to determine a location of a collapsed area of a high slope according to a coordinate change of each monitoring point in the slope images in the long time series.

Optionally, the precise location system further includes:
- a first grid division module, configured to conduct grid division on the deformed area in the slope image at the first time point in the slope images in the long time series, and determine a reference object at each grid intersection;
- a second grid division module, configured to conduct grid division on the deformed areas in the slope images in the long time series after the first time point through intersection-based line connection by using the reference object as an intersection, to obtain a corresponding grid of each grid in a deformed area in a slope image at each time point after the first time point; and
- a surface monitoring module, configured to select an area with the maximum deformation in the deformed areas according to shape changes of each grid and the corresponding grid of the grid as an updated deformed area.

Optionally, the precise location system further includes:
- a ground surface trend and corresponding underground stratum attribute monitoring module, configured to conduct cross-section analysis on the monitoring line area to obtain a ground surface trend and a corresponding underground stratum attribute of the monitoring line area.

Optionally, the high-slope collapsed area location determining module further includes:
- a broken-line graph establishment submodule, configured to establish a deformation broken-line graph of each monitoring point according to coordinates of the monitoring point in a slope image in each time series; and
- a high-slope collapsed area location determining submodule, configured to determine a location of a monitoring point with the largest variation range in the deformation broken-line graph as the location of the collapsed area of the high slope.

According to specific examples provided in the present invention, the present invention discloses the following technical effects:

The present invention provides a method and a system for precise location of a high slope collapse area. First, slope images in a long time series are obtained, the slope images in the long time series are composed into a two-dimensional slope deformation graph, and an area with the maximum deformation in the two-dimensional slope deformation graph is selected as a deformed area. Then, line partitioning is conducted on the deformed area, deformed areas, obtained after line partitioning, in the slope images in the long time series are displayed in an overlapping manner, and an area corresponding to a connecting line with the largest variation range is selected from an overlapped image as a monitoring line area. Finally, monitoring points are selected from the monitoring line area, and a location of a collapsed area of a high slope is determined according to a coordinate change of each monitoring point in the slope images in the long time series. In the present invention, a surface-to-line-to-point monitoring manner is used to realize precise location of a collapsed area of a high slope, so as to resolve a problem in an existing slope monitoring technology that change locations and trends of some areas with large deformation and a relatively high deformation speed cannot be precisely determined, without monitoring each point in obtained slope images in a long time series, thereby reducing the calculation amount.

In the present invention, grid division is further conducted to further select an area with larger deformation from the deformed area directly selected from the two-dimensional slope deformation graph, to further realize line-to-point monitoring, and increase a location speed of a collapsed area of the slope.

BRIEF DESCRIPTION OF DRAWINGS

To describe the schemes in examples of the present invention or the prior art more clearly, the following briefly describes the accompanying drawings required in the examples. Apparently, the accompanying drawings in the following description show some examples of the present invention, and a person of ordinary skill in the art may still derive other drawings from these accompanying drawings without creative efforts.

DETAILED DESCRIPTION

An objective of the present invention is to provide a method and a system for precise location of a high slope collapse area, to accurately determine a specific location of a collapsed area, so as to realize the real-time monitoring of a specific location of a collapsed area of a slope.

To make the foregoing objectives, features, and advantages of the present invention clearer and more comprehensible, the present invention is further described in detail below with reference to the accompanying drawings and specific examples.

Figure 1:
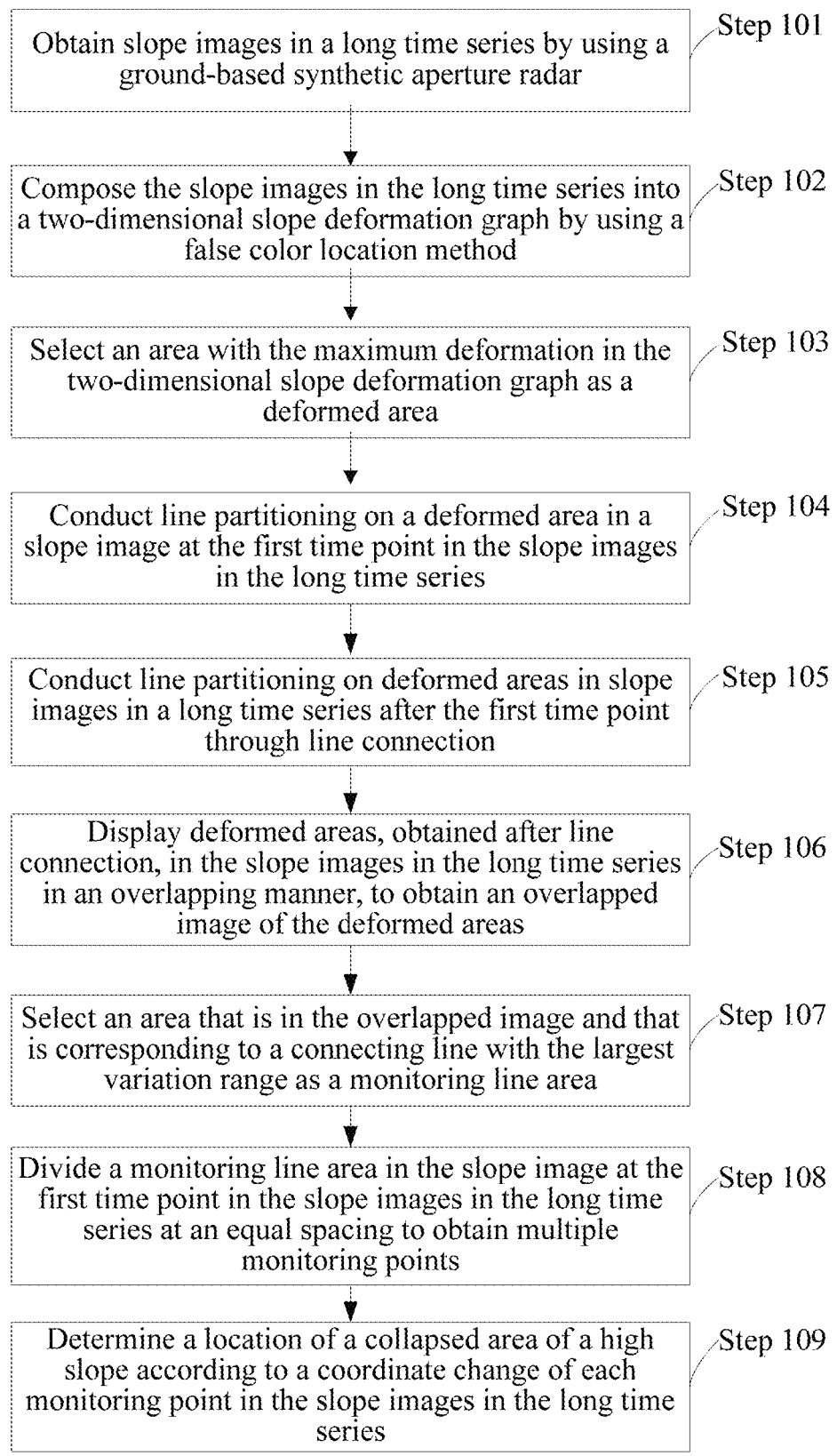
FIG. 1 is a flowchart of a method for precise location of a high slope collapse area according to the present invention.

As shown in FIG. 1, the present invention provides a method for precise location of a high slope collapse area. The precise location method includes the following steps:

Step 101. Obtain slope images in a long time series by using a ground-based synthetic aperture radar.

The deformation of a slope can be obtained through observation of the slope by using a ground-based synthetic aperture radar interferometry (GB-InSAR). The long time series in the present invention is a query period, and the query period N can be any specified time. In the present invention, the query period N can be set to 7 days, and the time interval of the long time series is 1 day. In this case, the long time series is 1 day, 2 days, 3 days, . . . , N days, where N=7.

Step 102. Compose the slope images in the long time series into a two-dimensional slope deformation graph by using a false color composition.

Figure 2:
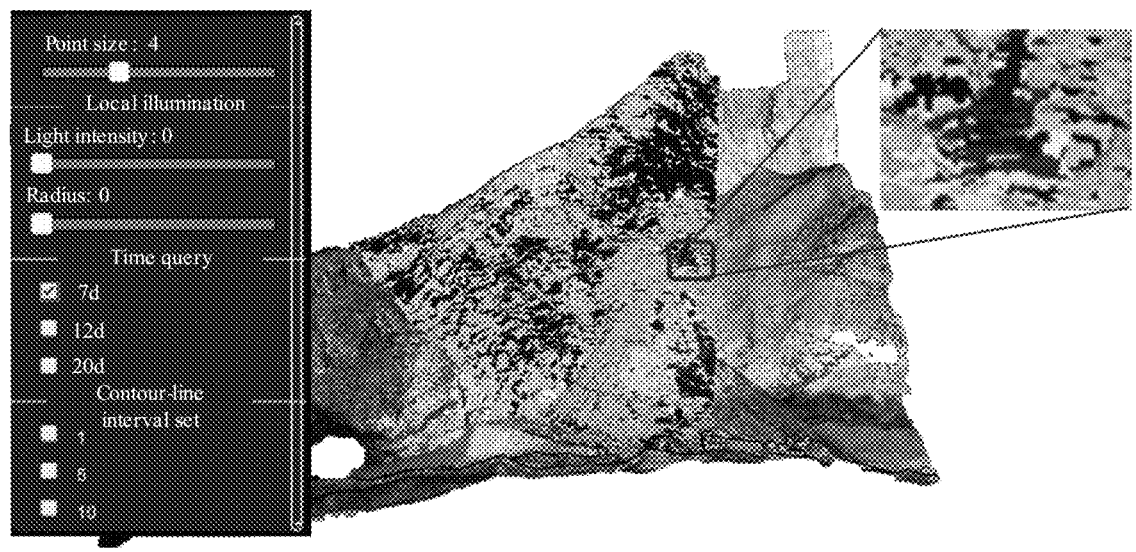
FIG. 2 is a schematic principle diagram of selecting a deformation area in two-dimensional slope deformation graph according to the present invention.

As shown in FIG. 2, the false color composition is also referred to as color composition. It is a kind of color enhancement technology that multiband monochrome images into a false color image according to an additive color method or a subtractive color method. The composed color image is usually different from a natural-color image, and may be arbitrarily transformed, and therefore it is referred to as a false color image. In the present invention, the slope images in the long time series are composed into the two-dimensional slope deformation graph by using the false color composition, and the slope deformation in N days is displayed in the two-dimensional deformation graph. A darker color of a deformed area indicates the larger deformation of the area. On the contrary, a lighter color of a deformed area indicates the smaller deformation of the area.

Step 103. The area with the maximum deformation in the two-dimensional slope deformation graph is selected as a deformation area.

As shown in FIG. 2, in the present invention, after a surface selection operation is conducted on a darker-colored area in the two-dimensional slope deformation graph, an enlarged deformation result graph of the area can be obtained. Because a high monitoring resolution is a major advantage of the ground-based radar interferometry technology, for a monitoring point that can reach a million-level resolution in a monitoring area, density of monitoring data can still be ensured regardless of how much a monitoring result is magnified.

Grid division is conducted on the deformed area in the slope image at the first time point in the slope images in the long time series, and a reference object at each grid intersection is determined; grid division is conducted on the deformed areas in the slope images in the long time series after the first time point through intersection-based line connection by using the reference object as an intersection, to obtain a corresponding grid of each grid in a deformed area in a slope image at each time point after the first time point; and an area with the maximum deformation in the deformed areas is selected according to shape changes of each grid and the corresponding grid of the grid as an updated deformed area. Grid division of the deformed area can be arbitrarily conducted according to an actual requirement, for example, 10×10, 20×20, and 30×30. The deformation of each part and each grid in the deformed area can be viewed in detail through grid division of the deformed area.

Step 104. Conduct line partitioning on a deformed area in a slope image at the first time point in the slope images in the long time series, and set multiple reference points on each straight line.

Figure 3:
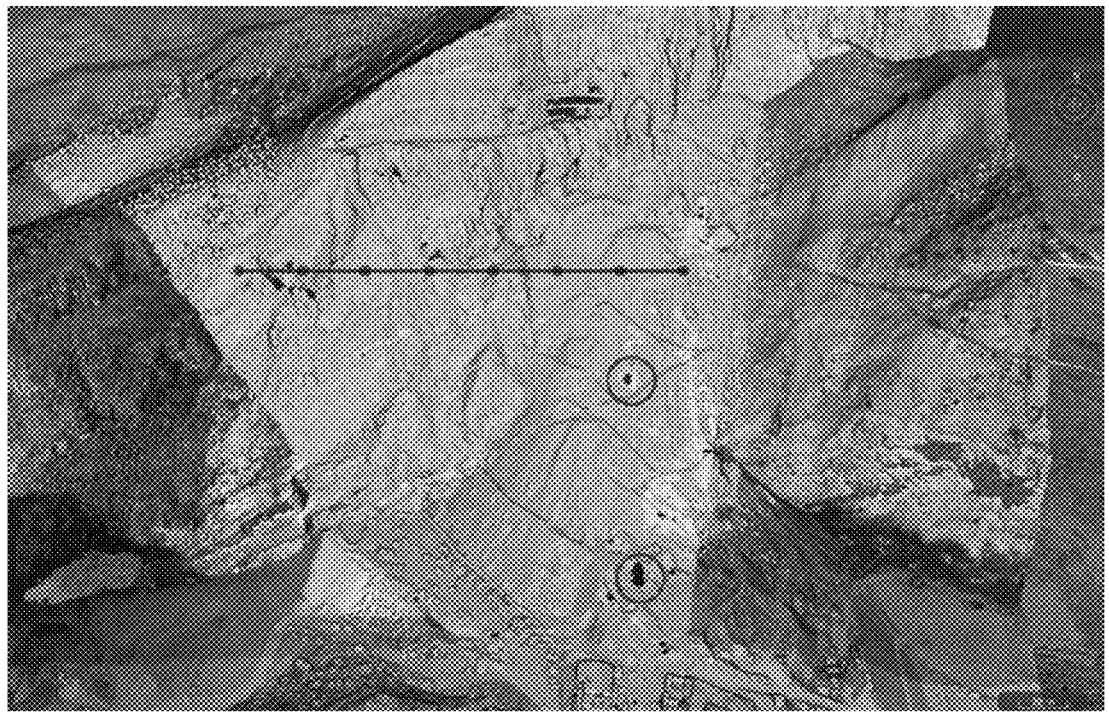
FIG. 3 is a schematic principle diagram of conducting line partitioning on a deformed area in a slope image at the first time point in slope images in a long time series and setting multiple reference points on each straight line.

As shown in FIG. 3, a straight-line drawing operation is conducted on the deformed area to divide the area by using N straight lines; reference points at an equal spacing are generated by using each straight line; and deformation information of the reference points at the equal spacing on each straight line is also obtained. Then, cross-section analysis is conducted on a slope deformed area in a location of the straight line. According to a status of a slope cross section, a ground surface trend and a corresponding underground stratum attribute of the drawn straight line can be obtained.

Figure 4:
FIG. 4 is a schematic principle diagram of conducting line segmentation for the deformation areas in slope images in a long time series after the first time point of slope images in a long time series through line connection.

Step 105. Conduct line partitioning on deformed areas in slope images in a long time series, including slope images in all time points after the first time point, of the slope images in the long time series through line connection based on the multiple reference points of each straight line, to obtain a corresponding connecting line of each straight line in a slope image in each time series that is after a first time series, as shown in FIG. 4.

Step 106. Display deformed areas, obtained after line connection, in the slope images in the long time series in an overlapping manner, to obtain an overlapped image of the deformed areas.

Step 107. Select an area that is in the overlapped image and that is corresponding to a connecting line with the largest variation range as a monitoring line area.

Figure 5:
FIG. 5 is a distribution diagram of coordinates, in a slope image after a first time series, of multiple monitoring points obtained by dividing a monitoring line area in a slope image at the first time point in slope images in a long time series at an equal spacing.

Step 108. Divide a monitoring line area in the slope image at the first time point in the slope images in the long time series at an equal spacing to obtain multiple monitoring points. In the present invention, a distribution diagram of coordinates, in a slope image after the first time series, of the multiple monitoring points obtained by dividing the monitoring line area in the slope image at the first time point in the slope images in the long time series at the equal spacing is shown in FIG. 5.

Step 109. Determine a location of a collapsed area of a high slope according to a coordinate change of each monitoring point in the slope images in the long time series.

Figure 6:
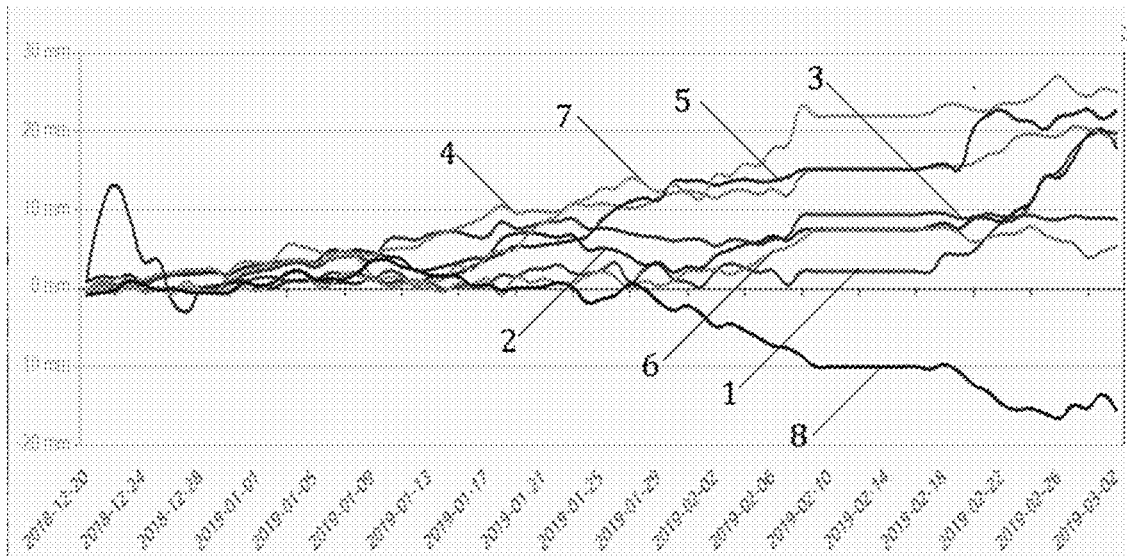
FIG. 6 is a deformation broken-line graph of monitoring points according to the present invention.

A deformation broken-line graph of each monitoring point is established according to coordinates of the monitoring point in a slope image in each time series, as shown in FIG. 6. A location of a monitoring point with the largest variation range in the deformation broken-line graph is determined as the location of the collapsed area of the high slope, that is, a location of a monitoring point 7 in FIG. 6 is the location of the collapsed area of the high slope.

Figure 7:
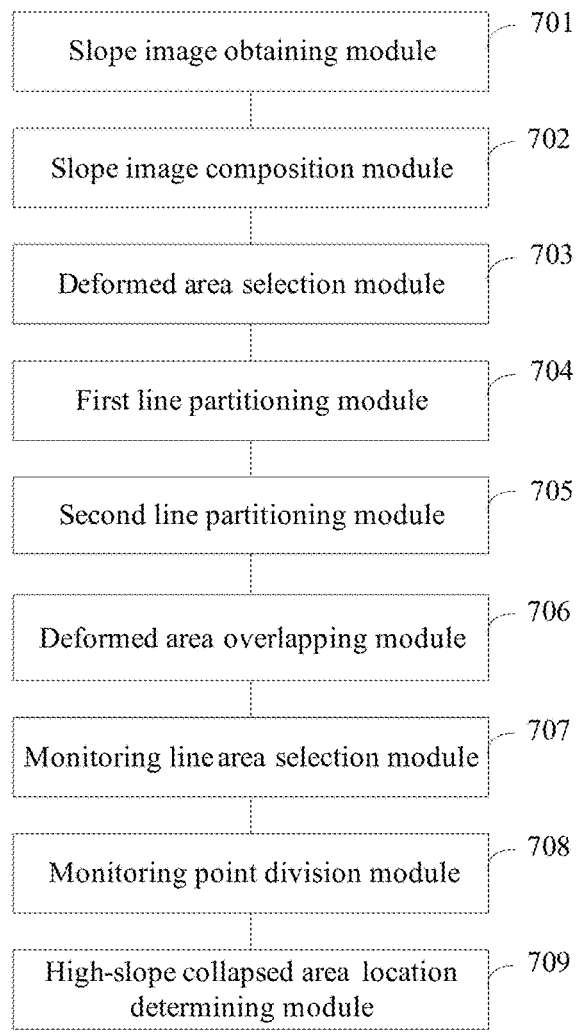
FIG. 7 is a structural diagram of a system for precise location of a high slope collapse area according to the present invention.

As shown in FIG. 7, the present invention further provides a system for precise location of a high slope collapse area. The precise location system includes a slope image obtaining module 701, a slope image composition module 702, a deformed area selection module 703, a first line partitioning module 704, a second line partitioning module 705, a deformed area overlapping module 706, a monitoring line area selection module 707, a monitoring point division module 708, and a high-slope collapsed area location determining module 709.

A slope image obtaining module 701 is configured to obtain slope images in a long time series by using a ground-based synthetic aperture radar.

The slope image composition module 702 is configured to compose the slope images in the long time series into a two-dimensional slope deformation graph by using a false color method composition.

The deformed area selection module 703 is configured to select an area with the maximum deformation in the two-dimensional slope deformation graph as a deformed area.

To better monitor the deformed area, the precise location system in the present invention further includes: a first grid division module, configured to conduct grid division on a deformed area in a slope image at the first time point in the slope images in the long time series, and determine a reference object at each grid intersection; a second grid division module, configured to conduct grid division on deformed areas in slope images in a long time series after the first time point through intersection-based line connection by using the reference object as an intersection, to obtain a corresponding grid of each grid in a deformed area in a slope image at each time point after the first time point; and a surface monitoring module, configured to select an area with the maximum deformation in the deformed areas according to shape changes of each grid and the corresponding grid of the grid as an updated deformed area.

The first line partitioning module 704 is configured to conduct line partitioning on the deformed area in the slope image at the first time point in the slope images in the long time series, and set multiple reference points on each straight line.

The second line partitioning module 705 is configured to conduct line partitioning on the deformed areas in the slope images in the long time series, including slope images in all time points after the first time point, of the slope images in the long time series through line connection based on the multiple reference points of each straight line, to obtain a corresponding connecting line of each straight line in a slope image in each time series that is after a first time series.

The deformed area overlapping module 706 is configured to display deformed areas, obtained after line connection, in the slope images in the long time series in an overlapping manner, to obtain an overlapped image of the deformed areas.

The monitoring line area selection module 707 is configured to select an area that is in the overlapped image and that is corresponding to a connecting line with the largest variation range as a monitoring line area.

To further determine deformation information of the monitoring line area, the precise location system in the present invention further includes: a ground surface trend and corresponding underground stratum attribute monitoring module, configured to conduct cross-section analysis on the monitoring line area to obtain a ground surface trend and a corresponding underground stratum attribute of the monitoring line area.

The monitoring point division module 708 is configured to divide a monitoring line area in the slope image at the first time point in the slope images in the long time series at an equal spacing to obtain multiple monitoring points.

The high-slope collapsed area location determining module 709 is configured to determine a location of a collapsed area of a high slope according to a coordinate change of each monitoring point in the slope images in the long time series.

The high-slope collapsed area location determining module 709 further includes a broken-line graph establishment submodule, configured to establish a deformation broken-line graph of each monitoring point according to coordinates of the monitoring point in a slope image in each time series; and a high-slope collapsed area location determining submodule, configured to determine a location of a monitoring point with the largest variation range in the deformation broken-line graph as the location of the collapsed area of the high slope.

According to specific examples provided in the present invention, the present invention discloses the following technical effects:

The present invention provides a method and a system for precise location of a high slope collapse area. According to the method in the present invention, a conventional method that only relies on manual determining of a specific location of a collapsed area in a deformed area of a slope is changed, and a point-line-surface integrated method for precise location of a high slope collapse area is established, so as to resolve a problem in an existing slope monitoring technology that locations of some areas with large deformation and a relatively high deformation speed cannot be precisely determined. First, on the two-dimensional slope deformation graph, a surface selection operation is conducted on an area with the large slope deformation; after the surface selection is completed, grid processing is conducted on the area, so that the deformation of each grid can be viewed in detail, so as to realize area (surface) monitoring of the deformed area of the high slope; and the deformed area is further updated and narrowed according to the deformation, to further increase a location speed of the collapsed area of the slope. Then, the deformed area is divided by using N straight lines to select a straight line with the maximum deformation; monitoring points are set on the straight line, and deformation analysis is conducted on each monitoring point on the straight line, to obtain a deformation broken-line graph of the monitoring point; and a monitoring point with the maximum deformation, that is, an accurate location of the collapsed area of the high slope, is found. In the present invention, a surface-to-line-to-point monitoring manner is used to realize precise location of the collapsed area of the high slope, so as to resolve a problem in the existing slope monitoring technology that change locations and trends of some areas with large deformation and a relatively high deformation speed cannot be precisely determined, without monitoring each point in obtained slope images in a long time series, thereby reducing the calculation amount.

Each example of the present specification is described in a progressive manner, and each example focuses on the difference from other examples. For the same and similar parts between the examples, mutual reference may be made. For a system disclosed in the examples, since the system corresponds to the method disclosed in the examples, the description is relatively simple. For related content, reference can be made to the method description.

The principles and implementations of the present invention have been described with reference to specific examples. The description of the above examples is only for facilitating understanding of the method and the core idea of the present invention, and the described examples are only some but not all of the examples of the present invention. All other examples obtained by persons of ordinary skill in the art based on the examples of the present invention without creative efforts shall fall within the protection scope of the present invention.

What is claimed is:

1. A method for precise location of a slope collapse area, wherein the method comprises the following steps:
    obtaining slope images in a time series by using a ground-based synthetic aperture radar;
    composing the slope images in the time series into two-dimensional slope deformation graphs by using a false color composition;
    selecting a respective area of each of the two-dimensional slope deformation graphs with a maximum deformation in the respective two-dimensional slope deformation graph as a respective deformed area;
    conducting line partitioning on each respective deformed area in a respective slope image at a first time point in the slope images in the time series to obtain respective straight lines, and setting multiple reference points on each of the respective straight lines;
    conducting line partitioning on the respective deformed areas in the slope images in the time series after the first time point through line connection based on the multiple reference points of each respective straight line, to obtain a corresponding connecting line of each respective straight line in a respective one of the slope images in each time point that is after the first time point;
    displaying the deformed areas, obtained after line connection, in the slope images in the time series in an overlapping manner, to obtain an overlapped image of the deformed areas;
    selecting an area that is in the overlapped image and that is corresponding to a connecting line with a largest variation range as a monitoring line area;
    dividing the monitoring line area in the slope image at the first time point in the slope images in the time series at an equal spacing to obtain multiple monitoring points; and
    determining a location of a collapsed area of a slope according to a coordinate change of each monitoring point in the slope images in the time series.

2. The method for precise location of the slope collapse area according to claim 1, wherein after the selecting the respective area, the method further comprises:
    conducting grid division on the deformed area in the slope image at the first time point in the slope images in the time series, to obtain a grid, and determining a reference object at each grid intersection;
    conducting grid division on the respective deformed areas in the respective slope images in the time series after the first time point through intersection-based line connection by using the reference object as an intersection, to obtain a corresponding grid in the respective deformed area in the respective slope image at each time point after the first time point; and
    selecting an area with a maximum deformation among the deformed areas according to shape changes of each grid and the corresponding grid as an updated deformed area.

3. The method for precise location of the slope collapse area according to claim 1, wherein after the selecting the area that is in the overlapped image, the method further comprises:
    conducting cross-section analysis on the monitoring line area to obtain a ground surface trend and a corresponding underground stratum attribute of the monitoring line area.

4. The method for precise location of the slope collapse area according to claim 1, wherein the determining the location of the collapsed area of the slope according to the coordinate change of each monitoring point in the slope images in the time series comprises:
    establishing a deformation broken-line graph of each monitoring point according to coordinates of the monitoring point in the associated slope image in each time point; and
    determining a location of a monitoring point, among the monitoring points of the slope images, with a largest variation range in the deformation broken-line graph as the location of the collapsed area of the slope.

\* \* \* \* \*